March 20, 1962 F. BUTZKE ET AL 3,026,371

METHOD OF AND APPARATUS FOR PRODUCING AND SENDING OUT AND/OR DECODING CODED MULTI-STEP ALPHABET TELEPRINTING

Filed March 14, 1957 5 Sheets-Sheet 1

Inventors:
Fritz Butzke
Hermann Graml
Sven Voelker

By [signature] Att'y

Inventors:
Fritz Butzke
Hermann Graml
Sven Voelker
By [signature] Att'y

Inventors:
Fritz Butzke
Hermann Graml
Sven Voelker
By
Atty.

Inventors:
Fritz Butzke
Hermann Graml
Sven Voelker
By [signature] Att'y.

Inventors:
Fritz Butzke
Hermann Graml
Sven Voelker
By [signature] Att'y 3,026,371

METHOD OF AND APPARATUS FOR PRODUCING AND SENDING OUT AND/OR DECODING CODED MULTI-STEP ALPHABET TELEPRINTING

Fritz Butzke, Baierbrunn-Buchenhain, and Hermann Graml and Sven Voelcker, Munich, Germany, assignors to Siemens & Halske Aktiengesellschaft Berlin and Munich, a corporation of Germany Filed Mar. 14, 1957, Ser. No. 645,953
Claims priority, application Germany Mar. 21, 1956
15 Claims. (Cl. 178—22)

The present invention relates to a system and apparatus for producing and transmitting and/or decoding coded multi-step alphabet teleprinting comprising mixing upon transmission, the clear text with the code text, signal element by signal element, for instance by simultaneously scanning one perforated tape each, and mixing upon reception, the coded text with the clear text, signal element by signal element, for instance by simultaneously scanning a code perforated tape with the reception of the teleprinter signals.

The object of the invention is to obtain the greatest assurance against unintentional transmission of the uncoded message or of the code text. This danger is to be avoided even in case of defective operation or failure of the relays used, as may occur for instance due to failure of relay contacts as a result of defective maintenance or contact shunting due to migration of material.

The invention realizes this object by connecting a mixer telegraph relay, acting as coding or decoding relay, with two windings over rectifiers respectively to a clear-text and a code text transmitter or a receiving relay contact for coded signals and a code text transmitter, a switch contact controlled by said mixer relay being operative, depending on the nature of the result of the multiplications of the signs of the associated combination elements to prepare or to interrupt the circuit of the control winding of the transmitting relay for the transmission of coded or for the transmission of decoded signals, with respect to a local receiving circuit.

In accordance with a further object and feature of the invention, a switch contact which is controlled by the mixer relay causes, during the interruption of the circuit of the transmitting relay which takes place incident to the starting step, the connection of the start-stop operation of a code-transmitter shaft and if desired a correction-distributor shaft, for instance by the energization of coupling magnets.

A central scanning of the mixer-relay contact settings is effected, in accordance with another feature of the invention, by the brief application of voltage to the transmitting relay during the pulsing after the transmitter switches for the clear text and for the code text have assumed an operating position.

In accordance with a further feature, there is used as mixer relay a non-polarized switching relay having two windings active in opposite directions in combination with a correction distributor for the central scanning of the mixer-relay-contact settings.

A device for carrying out these operations for alternate teleprinting in both directions comprises, in accordance with a further feature of the invention, a multipole transmitting-receiving switch which may be controlled by the transmitter shaft, arranged in combination with an equivalent inductance for the receiving magnet, and operating in such manner that, when the transmitter is not actuated, the receiving relay lies in the line circuit and the transmitting relay contact controls the receiving magnet in synchronism with the decoded current-pulse combinations, while, when the transmitter is actuated, the transmitting contact is connected over an equivalent inductance to the line, the receiving relay contact being open or being in a disconnected current path, and the connection between the mixer relay and the transmitter contact being maintained by a wiper arm of the transmitting-receiving switch.

This system, in accordance with a further feature of the invention, contains a duplex relay with two windings, one of which lies in the line circuit and the other in a local circuit in which it is traversed by current by way of a correction distributor contact upon all combination steps aside from the stop step, and further contains a duplex magnet provided in a local circuit of the perforated tape transmitting contact used both in the case of coded operation and in the case of uncoded operation such duplex magnet being short-circuited in the stop step upon de-energization of the duplex relay.

In accordance with a further feature of the invention, the dependability of transmission of properly coded teleprinter communications may be further increased and the construction of the polarized mixer relay simplified, while assuring the previously explained advantages, namely, avoidance of unintentional transmission of the uncoded message or of the code text even when the relays used operate defectively or fail entirely, for instance due to operational defects mentioned before. This is achieved by connecting a single winding of the mixer relay, which is controlled by the transmitters or contacts, in the bridge branch of a Graetz rectifier bridge, while the feed points of this bridge, in the case of a spacing step or element at one of these transmitters or contacts and of a marking step or element at the other transmitter or contact, lie at different potentials and, in the case of similar elements at the two controlling contacts lie at the same potentials, and that a second winding which is always traversed by current is provided for the mixer relay. The arrangement produces the additional result that further transmission of signals is inhibited in case of a defective interruption of the working winding, for instance due to a poor solder joint. When using two working windings, it could, on the other hand, happen that upon the interruption of the one winding, incompletely coded sigals are transmitted.

A preferred device for carrying out of the last-mentioned operations employs a self-contained rectifier bridge, in particular one embedded in a plastic block. It is in this manner substantially avoided that additional errors will occur due to an interruption in a rectifier branch of the bridge circuit.

In accordance with a further feature of the invention, the apparatus for carrying out the invention is of such a nature that the transmitters or contacts used for the signs multiplication of the associated combination elements are connected at one connecting point in each case to similar potentials while, with at other connecting point, the one transmitter or contact is connected to the one feed point and the other transmitter or contact to the other feed point of the rectifier bridge.

Further details of the invention will appear from the description rendered below with reference to the accompanying drawings. In the drawings, FIG. 1 shows the basic circuit diagram of a transmitting device of a teleprinter for coded operation;

Figures 1, 2:
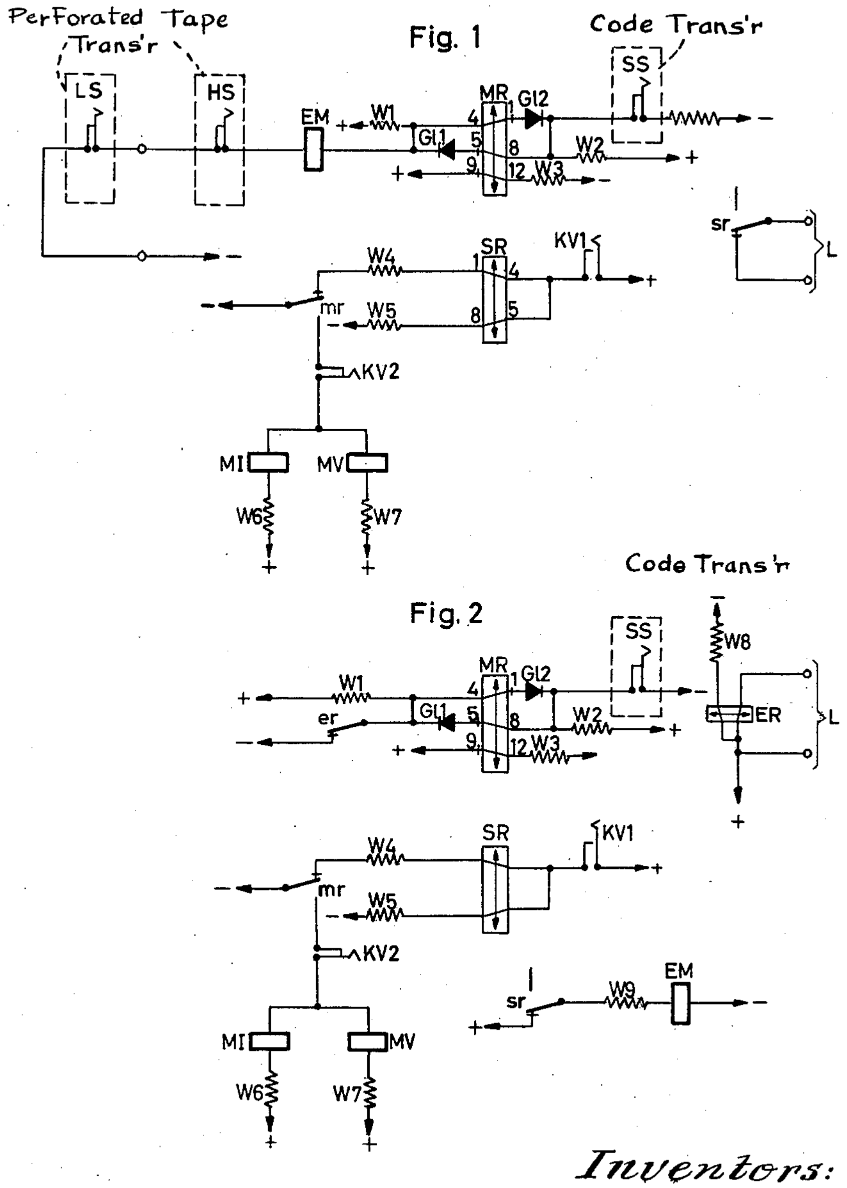
FIG. 2 shows a basic circuit diagram of a receiving device of a teleprinter for coded operation.

The transmission circuit in accordance with FIG. 1 has only two relays, both of which are developed as polarized telegraph relays with two normal positions of the armature. One of them forms a mixer relay MR which produces the coded transmission signals. The second relay SR acts as transmitting relay and therefore takes care of the sending out of the signals with minimum distortion. The mixer relay is fed, on the one hand, by the transmitting contact of a manual or perforated-tape transmitter HS or LS respectively with current pulses which correspond to the clear message and on the other hand by an arbitrary sequence of pulses which however is the same in the transmitter and receiver, these pulses coming from a code transmitter SS. The circuit furthermore contains a receiving magnet EM, rectifiers Gl1 and Gl2 as well as a release magnet MI for the shaft of the scanning device of a code-perforated-strip and a release magnet MV for the shaft of a correction distributor. The last-mentioned shaft controls two contacts KV1 and KV2. The mixer relay MR controls a switch contact *mr* and the relay SR a transmitter switch contact *sr* in a circuit extending over the line L. Furthermore, balancing resistors W1 to W7 and W11 are present in the circuit.

The manner of operation of the coding circuit with the mixer relay MR operating properly is as follows:

The holding winding MR9–12 places the mixer relay MR on the spacing side when the two other windings of this relay, which will be mentioned later, are not active. This is the case when both the contacts HS and LS respectively in the transmitter for the clear text as well as the contact SS in the code transmitter are open and thus no current flows in the windings MR1–4 and MR5–8. If all the contacts are closed, current flows:

+, W1, EM, HS, LS, – and

+, W2, SS, W11, – but not in the windings MR1–4 and MR5–8, since the same potential prevails at the winding ends 4 and 5 and 1 and 8 of this relay. In both of these cases, the relay MR shifts its contact *mr* to the spacing side so that the contact *sr* of relay SR remains connected to the line. This is the case in connection with the stop step or element and all those elements in which the contact positions in the clear- and code-sender agree.

If, on the other hand, the contacts LS and HS in the clear circuit are closed and the contact SS in the code sender is open, the current flows through the mixer relay MR:

+, W2, MR8–5, Gl1, EM, HS, LS, –

This current is twice as high as the current in the holding winding MR9–12 and directed in the opposite direction so that the mixer relay MR shifts its contact *mr* to the marking side. The same occurs when the contact HS or LS in the clear circuit is opened and the contact SS in the code circuit is closed. Current then flows through the winding MR4–1 of the mixer relay MR:

+, W1, MR4–1, Gl2, SS, W11, –

The contact *sr* is open at this instant which occurs responsive to the initial signal element and all those combination elements occurring when the clear sender and code sender give different markings.

The following conditions are therefore produced on the line as a function of the positions of the contacts of the clear sender and of the code sender:

| Clear Sender Contact | | Code Sender Contact | | Line | |
|---|---|---|---|---|---|
| Open | (–) | Open | (–) | Current | (+) |
| Closed | (+) | Closed | (+) | Current | (+) |
| Open | (–) | Closed | (+) | No current | (–) |
| Closed | (+) | Open | (–) | No current | (–) |
| Start step | (–) | Closed | (+) | No current | (–) |
| Stop step | (+) | Closed | (+) | Current | (+) |

The operation of the mixer relay therefore corresponds to so-called sign multiplication.

The time of the commencement of the transmission of signal elements is determined by the correction-distributor contact KV1, which controls the transmitter relay SR in proper timing. Therefore, distortion occurring in the local circuit will not be transmitted to the line. Of particular importance for maintaining the transmitted signals secret is that the closing time of the correction-distributor contact KV1 is short as compared with the element duration or length and that the elements are scanned in their center. Accordingly, there is assurance that differences in the commencement of the signals of clear and code circuits cannot be observed by oscillographs.

The advantage of the circuit is that in case of a failure of the mixing relay MR no transmission will be effected by the relay SR. If the switch contact MR remains continuously on the spacing side, no release of the code transmitter and of the correction distributor will take place. The switch contact *sr* remains at all times closed; no impulse combinations will be transmitted over the line L. If the switch contact *mr* is continuously on the marking side, the magnets MI and MV will release the shafts of the code sender and of the correction distributor, but no current pulse arrives at the transmitter relay SR. The latter accordingly remains actuated over its holding winding SR5–8, keeping its contact *sr* in the line circuit. If the contact *mr* is bridged, due to a disturbance, so that both stationary contact points are connected with the movable contact arm, the release of the shafts is effected; however, the relay SR receives no impulse combinations and the contact *sr* thus remains permanently on the spacing side, the winding SR1–4 being traversed by current as soon as the contact KV1 closes. This current is twice as high, as the holding current through the winding SR5–8 and is of opposite direction.

As shown by FIG. 2, basically the same circuit with extensively identical structural parts can also be used to receive coded teleprinter signals and decode them. A receiving relay ER with holding winding is actuated by simplex current markings on the line L. Its armature acts on a contact *er* over which a winding MR5–8 of the mixing relay can be fed, while the action of the code transmitter over its contact SS on the winding MR1–4 remains exactly the same as in FIG. 1. In the mixing relay, therefore, teleprinter signals which correspond to the coded message transmitted and the code text used in the transmitter are superimposed so that once again here is produced the initial clear message. The manner of operation of relay MR upon decoding is exactly the same as upon coding. The clear signals are transmitted by the relay contact *mr* to the transmitter relay SR, which now controls the receiving magnet EM over its contact *sr* in a local circuit. The starting of the signals of the SR relay are controlled precisely in time by the correction-distributor contact KV1 so that neither a distortion of the signals received over the line nor the pulses transmitted by the code sender over the contact SS can affect the operation of the receiving magnet EM.

The manner of operation of the apparatus corresponds in principle to that of FIG. 1. The circuit contains merely in addition the receiving relay ER and resistors W8 and W9.

Figure 3:
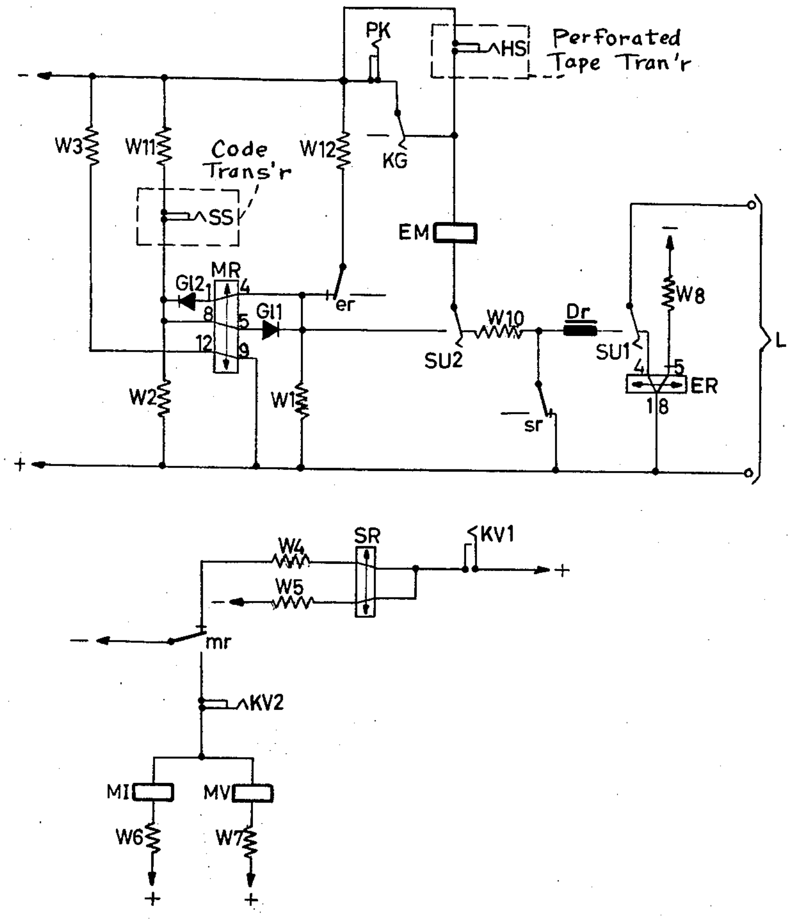
FIG. 3 shows a basic circuit diagram of a combined transmitting and receiving device with transmission-reception switch of a teleprinter for coded operation.

For teleprinter connections which operate alternately in both directions (so-called semi-duplex operation), the circuit described with reference to FIGS. 1 and 2, for transmitting and receiving may be combined in a joint circuit by using a transmitter-receiver switch SU1, SU2 is advisable. Such a circuit is as shown in FIG. 3. The contact SU1 serves for switching the line circuit L while contact SU2 switches the local circuit. In order to simplify the circuit, a perforated tape transmitter has been omitted. Upon its connection, a switching relay is energized the contacts of which replace the two transmitter-receiver switch contacts. Upon reaching the end of the tape or upon manual disconnection of the perforated tape transmitter, this relay denergizes and switches to reception.

When no transmission is effected, the receiving relay ER is connected in the line circuit L by way of switch SU1. Upon depression of a key, the transmitter rotation commences and the transmitting-receiving switches SU1, SU2 are reversed. Switch SU1 then connects the transmitter contact *sr* to the line L by way of a choke D*r* taking the place of the receiving relay.

A local circuit is connected in receiving condition in a circuit:

+, *sr*, SU2, EM, HS, –

The mixer relay MR is controlled by the armature of the receiving relay ER over contact *er* in order to decode the message received. Upon switching to transmission, the switch SU2 connects the transmitter contact HS to the mixer relay MR for the coding of the message to be transmitted. Since the relay ER is disconnected from the line L, it shifts its contact *er*, under the action of its holding winding, to the marking side so that said contact disconnects the negative potential from the terminals of the winding MR4 and MR5. The circuit contains in addition a "clear-coded" switch KG and a paper-feeler contact PK to prevent uncoded transmissions in the case of a disturbed code tape, and also contains balancing resistors W1–W8 and W10–W12.

In the circuits shown in FIGS. 1 to 3, a polarized telegraph relay is employed as mixing relay since it is particularly suitable for rapid response, high frequency of operation, and distortion-free operation. Moreover, a standardized design of the relays SR, ER and MR is thereby possible.

Figure 4:
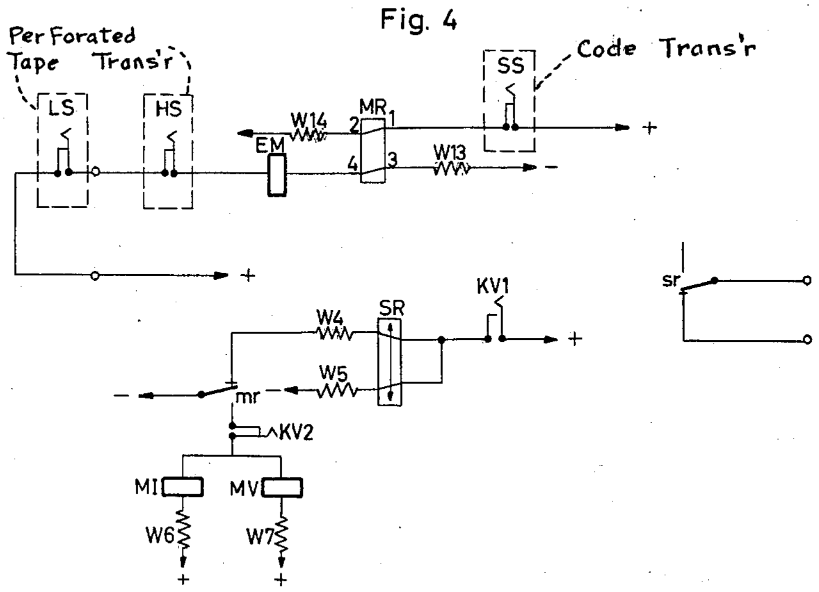
FIGS. 4 and 5 are basic diagrams showing modifications of the transmitting device according to FIG. 1.

Upon using a rapidly responding non-polarized switch relay suitable for a high switching speed as a mixing relay, certain simplifications of the circuit can be effected. FIG. 4 shows an example of a transmitting circuit having a neutral mixer relay MR. Its two windings MR1–2 and MR3–4 are traversed by current in opposite direction so that it does not attract its armature when both contact LS (or HS respectively) and contact SS are closed provided that the resistors W13 and W14 respectively lying in series with the contacts have suitable values. When these two contacts are open, the mixer relay MR remains deenergized, becoming energized only when only one of the circuits affected by the code sender or the clear transmitter is closed. The contact *mr* then acts precisely the same as in the case of the telegraph relay used as mixer relay in accordance with FIGURES 1–3.

The temporary inaccuracy in the reproduction of the signal elements by the armature is, as is well known, greater in the case of a non-polarized relay than in the case of a polarized relay. In the present circuit, this however is not disadvantageous since the transmitting is effected by the telegraph relay SR which is controlled by the correction distributor contact with distorting effect.

In the same way as it was possible in the case of the previously described transmitting circuits having a polarized mixer relay to combine them by means of a sending-receiving switch to form a circuit capable of semiduplex operation, this may also be done when using a neutral mixer relay.

Figure 5:
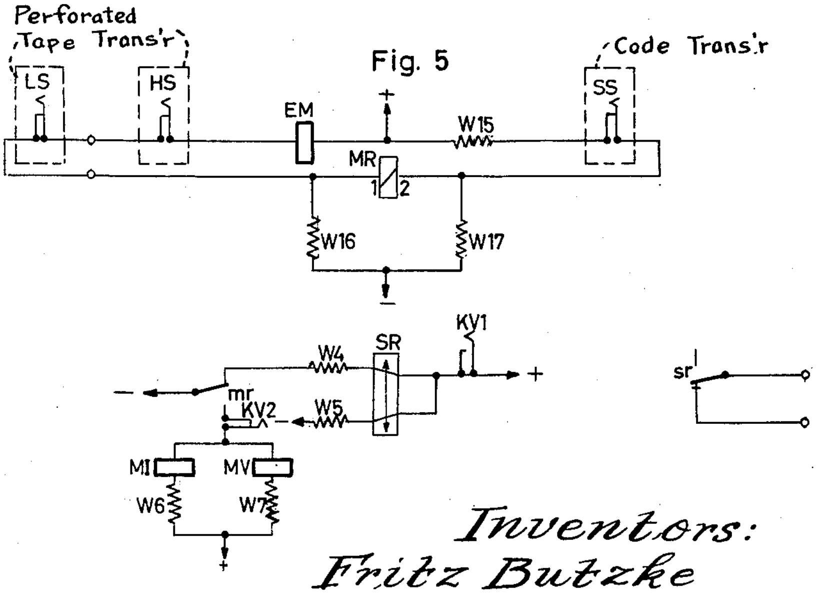

While in the above described circuit of FIG. 4 the relay MR has two windings, FIG. 5 shows a circuit having a mixer relay MR with only one winding. The mixer relay is in this case operated in a bridge circuit in which it remains deenergized when both the contact HS (or LS respectively) and the contact SS are open, and also when both are closed, provided the resistances of the resistors W16 and W17 are approximately equal and, similarly, the resistance of the winding of the receiving magnet EM corresponds to the resistance W15 (in series with the switch contact SS). In both cases, the same potential prevails at the terminals of the winding of the mixer relay. If on the other hand, the contacts HS and LS are closed and the contact SS is open, current flows in a circuit:

+, EM, HS, LS, MR1–2, W17, –

If one of the contacts HS or LS is open and the contact SS is closed, current also flows in a circuit:

+, W15, SS, MR2–1, W16, –

In these two cases therefore, the mixer relay MR attracts its armature. Its operation thus corresponds precisely to that described in the previous circuits.

Figure 6:
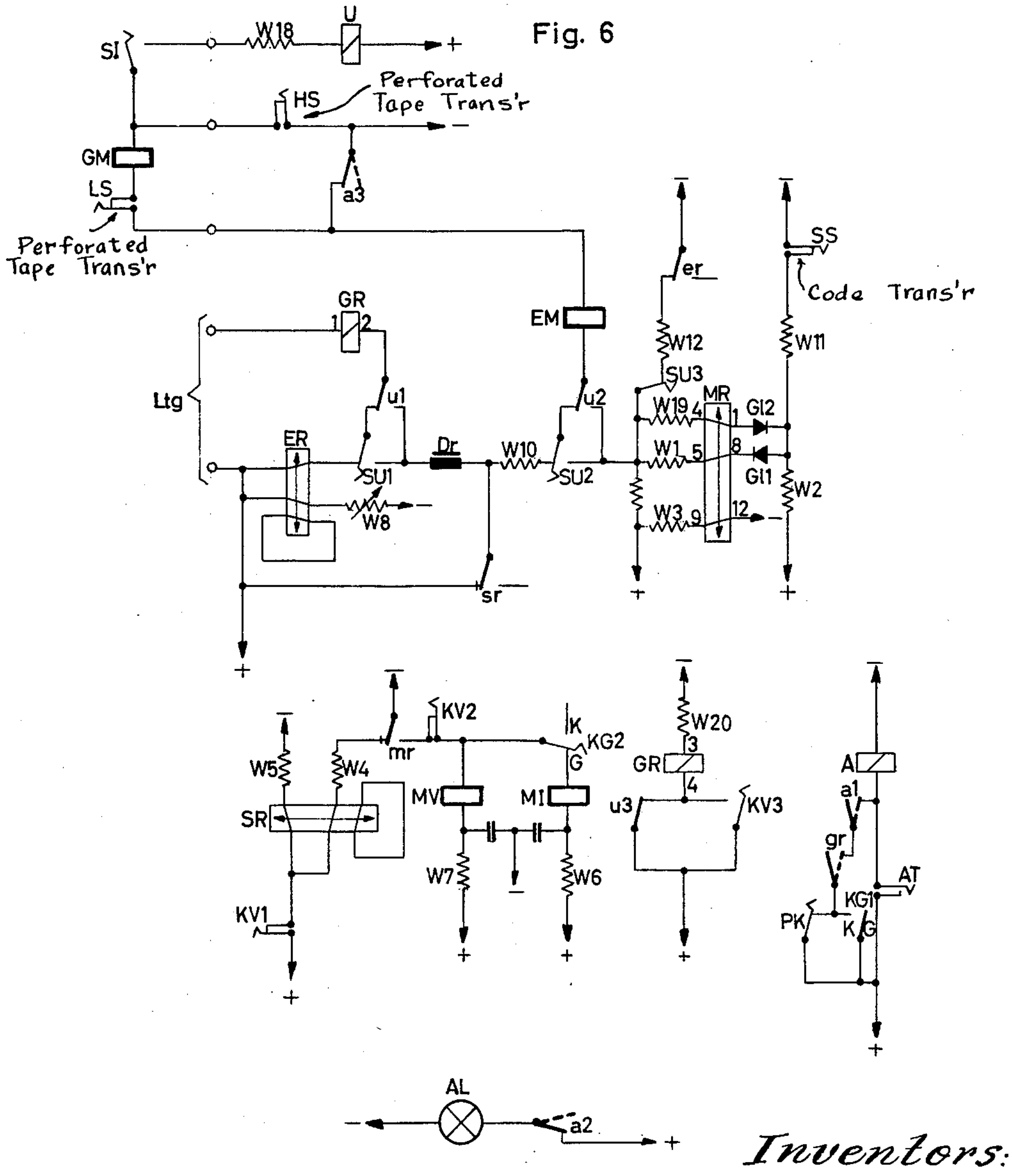
FIG. 6 is a basic circuit diagram of a combined transmitting and receiving device of a teleprinter for either coded or uncoded operation as desired, provided with duplex relay.

In the case of the circuit arrangement of FIG. 6 which may be employed alternately for clear operation and coded operation, once again keyboard sending or punched-tape sending are possible by means of the transmitter contact HS or the contact LS respectively controlled by a scanning device. In case of keyboard operation, upon striking any given key a transmitting-receiving switch SU1, SU2, SU3 is automatically briefly closed. In case of punched-tape operation, a switch S1 is closed together with the motor-connecting switch, not shown. This switch S1 closes a circuit for a relay U by way of a resistor W18. The relay U controls switch contacts *u*1 and *u*2 and a normal contact *u*3. In this way, upon the commencement of the transmission of a marking (in case of keyboard operation) or of a message (in case of punched-tape operation), the machine automatically shifts from receiving to transmitting and thus makes possible intermittent duplex operation with coding (in position G of a manually actuated switch KG1, KG2) or clear operation (in position K of switch KG1, KG2) without special manual switching.

The provision of a duplex relay GR having a winding GR1–2 in a line circuit L*tg*, permits interruption of the transmission at the receiving station, responsive to the stop element, in a manner which will be presently explained. Since the conditions upon transmitting or otherwise substantially similar to those in connection with the arrangement of FIG. 3, they will not be discussed in further detail. Aside from the above-mentioned structural parts, which are also present in FIG. 3, there are employed in the circuit arrangement of FIG. 6 resistors W19 and W20 and furthermore an alarm relay A having contacts *a*1 to *a*3 which will be presently explained, an alarm lamp AL, and an alarm shutoff key AT.

The manner of operation of the device upon receiving a punched-tape transmission, which may be interrupted by duplexing, is as follows:

The simplex current signals arriving over the line L*tg* are received by means of the receiving relay ER. The line circuit is closed over GR1–2, *u*1, SU1, ER. The receiving relay ER controls, over contact *er*, the mixer relay MR, which, in case of clear operation, merely repeats the signals and thus further controls the transmitting relay SR in the form of clear-text signals. The transmitting relay contact *sr* scans the local circuit of the teleprinter:

+, *sr*, W10, SU2, *u*2, EM, LS, GM, HS, W18, – thus actuating the receiving magnet. GM is a duplex magnet in the punched-tape sender. If now duplex communication is effected by actuating the keyboard of the receiving teleprinter, the transmitting-receiving switches SU1, SU2, SU3 are automatically shifted into the transmitting position, not shown in the drawing. The spacesignals used for instance for the duplex operation, pass to the mixer relay MR in a circuit:

—, HS, GM, LS, EM, *u*2, SU2 (reversed), W1, MR5–8, G*l* 1, W2, + which in turn controls the relay SR in previously described manner. The latter transmits over its contact *sr* against the signals coming in on the line, in a circuit:

Line, GR1–2, *u*1, SU1 (reversed), D*r*, *sr*, Line

The line circuit is thus also interrupted incident to the stop element of the corresponding transmitter.

At corresponding transmitting station, which has a similar switch arrangement, the relay GR deenergizes since the winding GR1–2 is incident to the stop element without current and the winding GR3–4 disconnected from current by the distributor contact KV3; by means of the relay contact *gr*, the alarm relay A is disconnected from current; by opening its contact *a*1, it interrupts its holding cicrcuit and by closing contact *a*2 causes the alarm lamp AL to light up and by means of its contact *a*3 short-circuits both the perforated-tape transmitter contact LS and the duplex magnet GM. The perforated-tape transmitter is in this way disconnected in known manner and thus the contact S1 is also opened. As a result, the switching relay U is also deenergized; it switches the originally transmitting machine from punched-tape transmission to reception. By closing the contact *u*3, the duplex relay GR is again energized via the winding GR3–4. The alarm relay A however can only respond again after actuation of the alarm shutoff key AT, in which case the alarm lamp AL is extinguished and the short circuit of the transmitting contacts LS and HS is eliminated. Both teleprinter machines, connected with each other, are again ready for transmitting and can communicacte with each cother in "clear" operation.

Figures 7, 8:
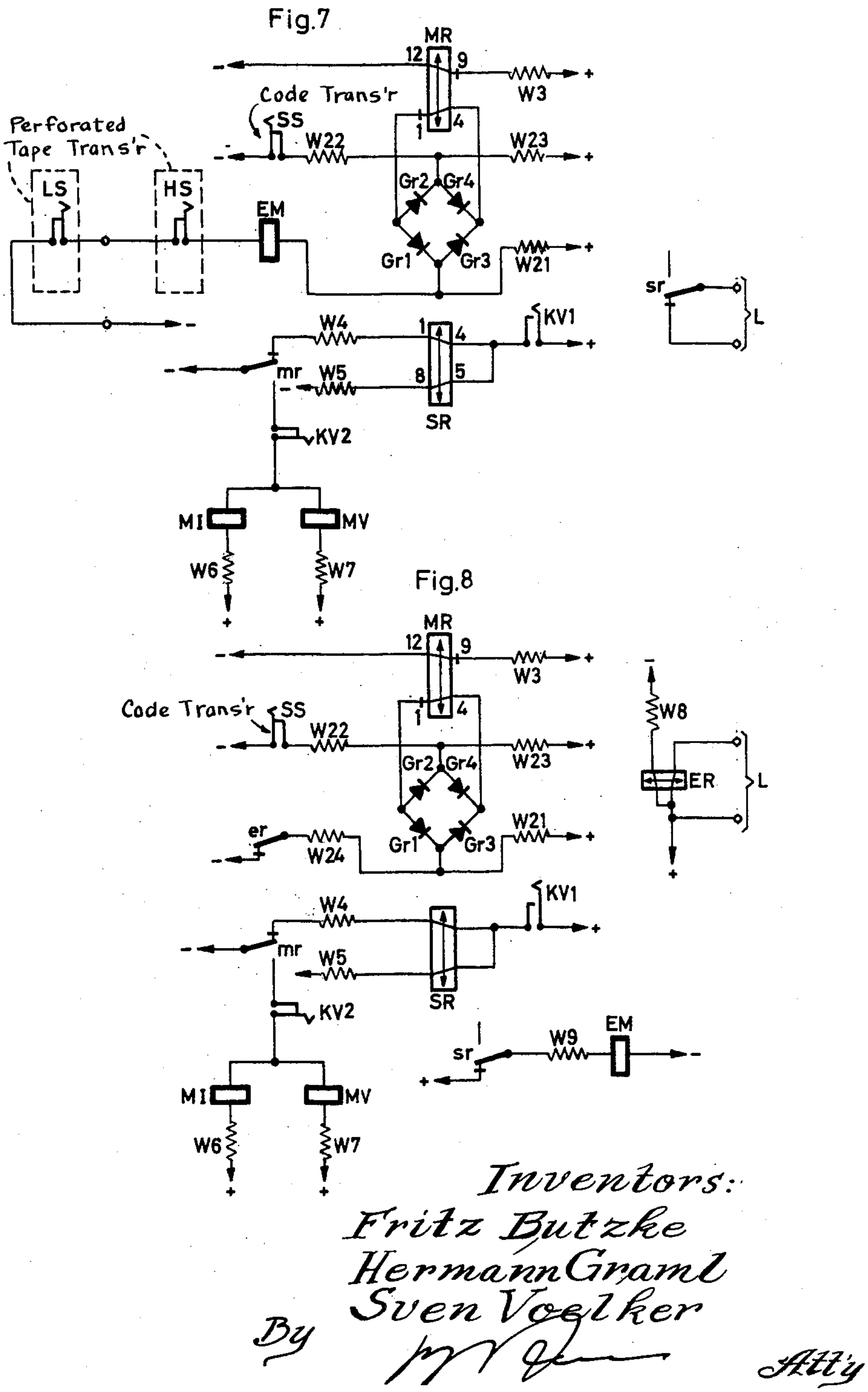
FIG. 7 is a basic circuit diagram of another transmitting device of a teleprinter for coded operation.
FIG. 8 is a basic diagram of another receiving device of a teleprinter for coded operation.

The transmitting circuit in accordance with FIG. 7 is similar to the one shown in FIG. 1, and has only two relays which are both polarized telegraph relays with two normal positions of the armature. One of them is a mixing relay MR which produces the coded transmitting signals; the second relay SR acts as transmitting relay effecting the transmission of signals with minimum distortion. The mixer relay is fed on the one hand by the transmitter contact of a manual or punched-tape transmitter HS or LS, respectively, with current pulses which correspond to the clear message, and pulses of any desired sequence, which however is the same in the transmitter and in the receiver, such pulses coming from a code transmitter SS. The circuit furthermore contains a receiving magnet EM, a rectifier bridge formed of rectifiers G*r*1, G*r*2, G*r*3 and G*r*4 connected in a Graetz circuit, as well as a release magnet MI for the shaft of the scanning device of a code perforated-tape and release magnet MV for the shaft of a correction distributor; the last-mentioned shaft controls two contacts KV1 and KV2 which are also present in the circuit. The relay MR controls a switch contact *mr* and the relay SR a transmitter switch contact sr in the circuit leading over the line L. W3 to W7 and W21 to W23 are balancing resistors.

The manner of operation of the coding circuit when the mixer relay MR is operating properly is as follows:

The winding MR 9–12 places the mixing relay MR to the spacing side when the working winding MR1–4 of this relay, which will be discussed in further detail below, is not active. This is the case when both the contacts HS or LS in the transmitter for the clear text and the contact SS in the code transmitter are open so that no current flows in the winding MR1–4. If the circuits for two of said contacts are closed, current flows in circuits:

+, W21, EM, HS, LS, — and

+, W23, W22, SS, — but when the resistors through which the current flows are of the same value, current will not flow in the winding MR1–4 lying in the diagonal circuit of the rectifier bridge since the same potential prevails at the terminals of the windings 1 and 4 of this relay. In these two cases, the relay MR shifts its contact *mr* to the spacing side so that the contact *sr* of the relay SR on the line remains closed. This occurs incident to the locking signal element and in the case of all those signal elements in which the contact positions in the clear and code senders agree.

If, on the other hand, the contacts LS and HS in the clear circuit are closed and the contact SS in the code transmitter is open, the current flows through the mixing relay MR in a circuit:

+, W23, G*r*4, MR4–1, G*r*1, EM, HS, LS, — and furthermore a parallel circuit is produced:

+, W21, EM, HS, LS, —

The current through the winding MR4–1 is twice as high as the current in the holding winding MR9–12 and of the opposite direction so that the mixer relay MR shifts its contact *mr* to the marking side. The same takes place when the contact HS or LS in the clear circuit is opened and the contact SS in the code circuit, on the other hand, remains closed. Current then flows through the winding MR4–1 of the mixer relay MR in a circuit:

+, W21, G*r*3, MR4–1, G*r*2, W22, SS, — and furthermore a parallel current is produced:

+, W23, W22, SS, —

The contact *sr* is thereby opened; this applies incident to the starting signal element and incident to all those combination signal elements in connection with which the clear sender and code sender give different signals.

The manner of operation of the mixer relay again corresponds to so-called sign multiplication.

The other conditions, for instance with respect to the moment of the commencement of the start of transmission, also correspond to those of the arrangement shown in FIG. 1.

As shown in FIG. 8, basically the same circuit with extensively identical structural elements may also be used to receive coded teleprinter signals and decode them. A receiving relay ER with holding winding is actuated by simplex current signals on the line L. Its armature actuates contact *er* over which the winding MR1–4 of the mixer relay may be fed in the same manner as was done previously by the contacts LS and HS respectively, only with the insertion of a resistor W24 instead of the winding of the receiving magnet EM, while the action of the code sender over a contact SS on the winding MR1–4 remains exactly the same as before. In the mixer relay MR, teleprinter signals which correspond to the coded transmitted message and the code text also used in the transmitter are superimposed so that again there is produced the initial clear message. The manner of operation of the relay MR upon decoding is exactly the same as upon coding. The clear signals are transmitted by the relay contact *mr* to the transmitting relay SR, which controls the receiving magnet EM over its contact *sr* in a local circuit. The signal commencements of the SR relay are again controlled precisely in time by the correction distributor contact KV1, as in the arrangement in accordance with FIG. 2.

The manner of operation of the arrangement corresponds in principle precisely to that of FIG. 7. The circuit merely contains, in addition, the receiving relay ER and the resistors W8, W9 and W24.

It is within the scope of the invention possible to place the transmitter contact SS in series with the resistor W21 between the connecting point which leads to the rectifiers G*r*1 to G*r*3 and the positive terminal of the voltage source, or to connect the transmitter contacts LS and HS between the connection point which connects the rectifiers Gr2 to Gr4 with the resistor W22 and the positive terminal in series with the resistor W22. The arrangement of these transmitter contacts as explained in the described example is however preferable in view of the fact that advantages resulting in the construction of the sender-receiver switching.

Changes may be made within the scope and spirit of the appended claims.

We claim:

1. In a circuit arrangement for respectively producing and transmitting and decoding coded single current signals according to the plural element alphabet, which is effected incident to transmission of a mixture of the clear text with code text, signal element-wise, as by simultaneous scanning of perforated tapes, and incident to the reception, a mixing of the coded text with the code text, signal element-wise, as by simultaneous scanning of a perforated code tape with the reception of the telegraph signal, a mixing relay having energizing winding means, a clear text transmitter and a code text transmitter, circuit means operatively related to said transmitters and said winding means and cooperable herewith to produce balanced or unbalanced operating conditions at said relay responsive to predetermined transmitter operating conditions, relay contact means associated with an actuated by said relay depending upon the balanced or unbalanced condition of said mixing relay, a transmitting relay having a control winding and being operatively connected to said clear and code text transmitters, whereby coded or decoded transmission may be effected, said control contact means being operatively associated with said control winding for the control of said transmitting relay.

2. A system according to claim 1, wherein said last named contact means causes during the interruption of the circuit of the transmitting relay which takes place incident to the starting signal element, the connection of the start-stop operation of a code-transmitter shaft and a correction-distributor shaft:

3. A system according to claim 2, wherein a single winding of the mixer relay controllable by said transmitters and located in a bridge branch of a Graetz type rectifier bridge, feed points of this bridge, in the case of a spacing signal element at one of the transmitters and of a marking step at the other transmitter, being on different potentials, and in the case of similar signal elements at the two controlling contacts, being at the same potentials, and a second winding for said mixer relay which is always traversed by current.

4. Apparatus according to claim 3, wherein said rectifier bridge forms a self-contained structural element disposed within a plastic block.

5. Apparatus according to claim 3, wherein the transmitters used for the sign multiplication of the associated combination elements are connected at one connecting point in each case to similar potentials, while one transmitter is over the other connecting point connected to the one feed point and the other transmitter to the other feed point of the rectifier bridge.

6. A system according to claim 1, wherein a central scanning of the mixer-relay contact settings is effected by brief application of a voltage to the transmitting relay during the pulsing after the transmitter switches have assumed an operating position.

7. A system according to claim 1 comprising a mixer relay having a single winding which lies in the diagonal branch of a bridge circuit comprising resistors and clear-signal and/or code-signal transmitter contacts respectively located in two bridge branches connected with a similar potential, the bridge branches connected with the same potential having at least approximately the same resistances.

8. Apparatus for a system according to claim 1 for alternate teleprinting in both directions, comprising a multi-pole transmitting-receiving switch controlled by the transmitter shaft, means for arranging said switch in combination with an equivalent inductance for the receiving magnet, said arrangement being such that when the transmitter is not actuated, the receiving relay lies in the line circuit and the transmitting relay contact controls the receiving magnet in synchronism with the decoded current-pulse combinations, while, when the transmitter is actuated, the transmitting contact is connected over said equivalent inductances to the line, the receiving relay contact being open or being disconnected, and the connection between the mixer relay and the respective transmitter contacts being maintained by a wiper arm of the transmitting-receiving switch.

9. Apparatus for a system according to claim 8, for a teleprinter alphabet with lock step, comprising a duplex relay having two windings, one of said windings being disposed in the line circuit and the other in a local circuit traversed by current over a correction distributor contact upon all combination signal elements aside from the stop element, and a duplex magnet disposed in a local circuit of a transmitting contact used both in the case of coded operation and in the case of uncoded operation being short-circuited incident to the stop signal element upon the de-energizing of said duplex relay.

10. Apparatus according to claim 9, wherein said duplex relay controls an alarm relay which short-circuits the duplex magnet to effect operation of an alarm device.

11. Apparatus according to claim 10, wherein said duplex magnet is energized in the presence of disturbances in the code-text transmitter.

12. Apparatus acording to claim 11, comprising a holding contact for the alarm relay, means for connecting said holding contact in series with the duplex printers and switches which signal disturbances, and a manually actuated alarm shutoff key connected in parallel to the series connection of said switch elements.

13. A circuit arrangement as defined in claim 1, wherein said mixing relay is provided with two energizing windings, one winding extending over the clear text transmitter and the other winding extending over the code text transmitter.

14. A circuit arrangement as defined in claim 13, wherein said two energizing windings are oppositely active.

15. A circuit arrangement as defined in claim 1, wherein said mixing relay is provided with an energizing winding in a bridge circuit, whereby said winding, in transmission, extends over the clear text and code text transmitters, and in receiving, over a receiver relay contact for the coded signals and a code text transmitter.

References Cited in the file of this patent

UNITED STATES PATENTS

| | | |
|---|---|---|
| 2,401,855 | Briggs | June 11, 1946 |
| 2,401,877 | Mathes | June 11, 1946 |
| 2,405,569 | Fitch et al. | Aug. 13, 1946 |
| 2,406,020 | Lang et al. | Aug. 20, 1946 |
| 2,874,215 | Zenner | Feb. 17, 1959 |